May 15, 1934.   F. B. BRISTOL   1,958,813
HYGROMETER
Filed Jan. 26, 1933
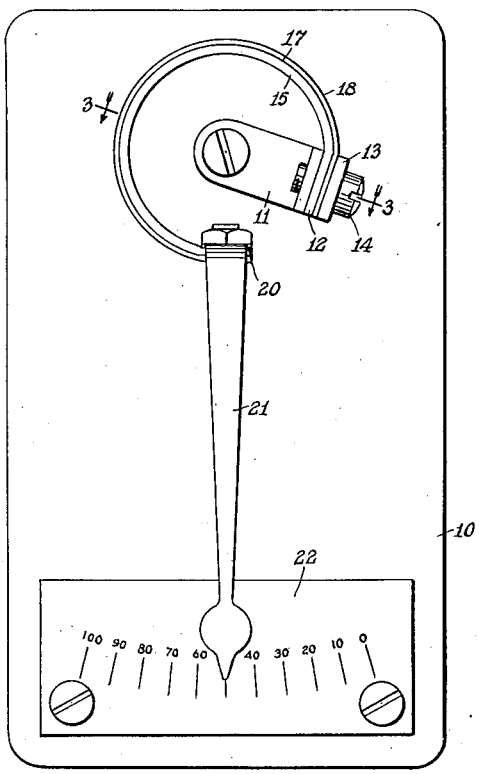
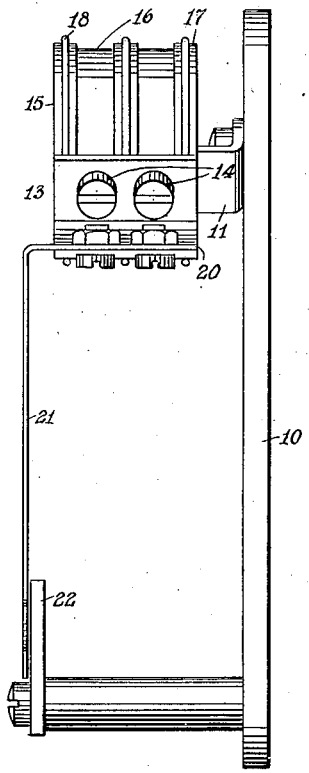
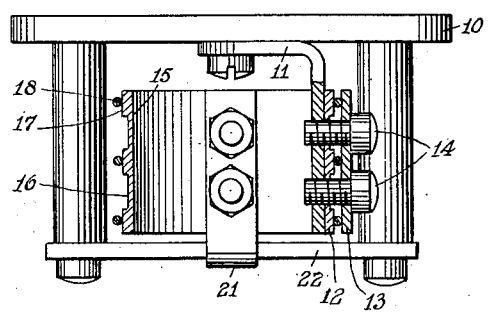
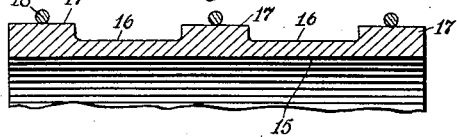
INVENTOR
FRANKLIN B. BRISTOL
BY
ATTORNEY Patented May 15, 1934

1,958,813

UNITED STATES PATENT OFFICE 1,958,813

HYGROMETER

Franklin B. Bristol, Waterbury, Conn., assignor to The Bristol Company, Waterbury, Conn., a corporation of Connecticut Application January 26, 1933, Serial No. 653,615

4 Claims. (Cl. 73—24)

The invention relates to measuring apparatus, more especially as utilized in the determination of relative humidity.

It has for an object the provision of a simple and rugged precision instrument embodying a member of hygroscopic material whose changes in physical dimensions are indicative of the relative humidity conditions of a surrounding atmosphere.

It has for a further object the use therein of a natural fibrous organic material possessing the required capillary structure for absorbing the moisture to which it may be exposed.

It is well known that hygroscopic phenomena are based to some degree upon the surface tension of a liquid and may express themselves as capillarity—the tendency of liquids to force themselves into tubular spaces of exceedingly small diameter. For these forces to be sufficient in magnitude to produce measurable distortion of the containing walls, it is necessary that the capillary bores have a diameter of the order of a millionth of a millimeter. As it is not practicable to produce such small bores except through the processes of nature, it becomes necessary to select and utilize such natural materials as may be found to possess the desired capillary structure, for example, wood or compressed wood fibres such as "beaverboard" or paper, and treated to remove sap and other causes of erratic performance.

Still another object of the invention resides in the provision of a humidity responsive element of such material and so constituted that it is prevented from warping or twisting and at the same time will afford a maximum exposed surface for intimate contact with the ambient atmosphere, thus providing for a rapid and precise response to changes in relative humidity.

Another object is to so construct the hygroscopically responsive element that a maximum response therefrom may be had, in that the restraining effect of its one side is minimized while the maximum surface of the opposite side is kept available.

A still further object of the invention resides in the provision of a hygrometer which shall be relatively inexpensive to manufacture, efficient in operation, readily installed, and durable and reliable in service.

In carrying out the invention, a flexible strip of fibrous hygroscopic material of the nature hereinbefore set forth is coiled to a more or less circular or arcuate form, with one end secured to a rigid support of non-hygroscopic material, while the free end is arranged to carry a transmitting element or measuring member also of non-hygroscopic material. Along the convex or the concave face of this arcuate hygroscopically responsive element are a number of longitudinally extending ribs adapted to receive flexible non-hygroscopic members, as of wire, to be cemented thereto and adapted to exert a restraining action over the one surface of the element as it tends to become distorted upon variations in the surrounding humidity conditions. The tension exerted by these flexible wires on the one side of the strip will thus cause the distortional action of the strip itself to be translated into a change in curvature of the humidity responsive element, which change is utilized as a measure of the variation in humidity conditions, through the member assocated with its free end.

The nature of the invention, however, will best be understood when described in connection with the accompanying drawing, in which:

Fig. 1 is a front elevation of a hygrometer embodying the invention, and with surrounding casing removed.

Fig. 2 is a side elevation thereof.

Fig. 3 is a transverse section through the hygrometer, taken on the line 3—3, Fig. 1 of the drawing and looking in the direction of the arrows.

Fig. 4 is an enlarged fragmentary transverse section through the novel hygroscopic element utilized in the hygrometer.

Referring to the drawing, 10 designates a suitable plate or support member for the novel hygroscopic element hereinafter set forth, and the same may be secured to the base plate 10 as by means of a bracket element 11. The latter is for this purpose secured to the one end 12 of the hygroscopic element, as through a clamping plate 13 and screws 14.

This responsive or hygroscopic element is formed into a substantially arcuate shape, as shown; and is composed of a thin strip 15 of not over .045 of an inch thickness and of sap-freed wood cut either cross-grain with the fibres of the wood lying substantially parallel to the axis of curvature of the strip, or end-grain. Or, compressed wood fibre similar to "beaverboard", paper and the like may be utilized for this purpose and correspondingly shaped.

Over one of its surfaces, for example the outer face as shown, the strip 15 is grooved or provided with one or more channels 16 which not only serve to decrease the thickness of the material but provide parallel ridges 17 or reinforcing ribs for supporting more or less resilient restraining members of substantially non-hygroscopic material. The latter are indicated as parallel wires or bands 18 which may be of suitable resilient metal such as phosphor-bronze or of material of a non-hygroscopic nature such as bakelite, hardened lacquers having a cellulose base, etc., and are to be fixedly secured to the respective ribs as by being cemented thereto or directly applied. The channels 16, furthermore, tend to prevent undue warping of the strip material between the parallel bands of resilient material.

The free end 20 of the hygroscopic element has rigidly secured thereto a pointer or other suitable measuring element 21 designed, for example, to move over a scale 22 fixed to the plate 10 and graduated in values representative of the curvature of the responsive hygroscopic element aforesaid. This element, in being exposed to an atmosphere whose humidity it is desired to determine, will with change in the moisture content of such atmosphere effect a change in its curvature through the swelling or contracting, in a transverse sense, of the fibres of said element and to a degree depending upon the relative humidity of the ambient atmosphere. Being reduced to a relatively thin section through the provisions of channels or grooves 16 and exposed on both sides to the action of the surrounding atmosphere, the said hygroscopic element affords an active surface relatively large in proportion to its volume and tends also toward a rapid equalization of moisture conditions throughout its mass, thus being proportionately quick to respond to changes in the humidity condition. The swelling or shrinkage of the wood or other material composing the responsive element is, as said, due to the moisture conditions, but the tension of the flexible wires or bands 18 along the one side of the strip of material will cause the movement due to the humidity changes to be translated into a change in curvature of said strip which, in turn, is communicated to the pointer 21 affording in association with the scale 22 an indication of the relative humidity to which the said responsive hygroscopic element has been exposed. The expansion effect of the said wires or other material under thermal variations will be minimized due to the relatively small amount of metal involved; and, furthermore, these wires cover but a minimum area of the surface of the responsive element so that a maximum effect of the same in response to moisture variations is attained.

I claim:

1. In a hygrometer: a rigid, non-hygroscopic support, a curved strip of hygroscopic material adapted to be exposed on its opposite faces to humidity conditions to be measured, said strip being provided with longitudinal ribs over its one face and secured at one end to the rigid support, flexible non-hygroscopic members secured along said ribs, and means associated with the free end of the strip for measuring changes in curvature of said element under humidity variations in its surrounding atmosphere.

2. In a hygrometer: a rigid, non-hygroscopic support, a thin strip of wood, arc-shaped and channeled longitudinally over its one face to provide corresponding ridges, flexible, non-hygroscopic members secured along said ridges, and means associated with the free end of the strip for measuring changes in curvature of said element under humidity variations in its surrounding atmosphere.

3. In a hygrometer: a rigid, non-hygroscopic support, a thin strip of wood, arc-shaped and channeled longitudinally over its one face to provide corresponding ridges along the edges and at an intermediate point, flexible, non-hygroscopic members secured along said ridges, and means associated with the free end of the strip for measuring changes in curvature of said element under humidity variations in its surrounding atmosphere.

4. A hygroscopic element consisting of a curved strip of hygroscopic material provided with longitudinal ribs over its one face and flexible non-hygroscopic means secured along said ribs.

FRANKLIN B. BRISTOL.